US009710817B2

(12) United States Patent
Vaidyanathan et al.

(10) Patent No.: US 9,710,817 B2
(45) Date of Patent: Jul. 18, 2017

(54) ADAPTIVE RUN-TIME ADVERTISEMENTS

(75) Inventors: Shankar Vaidyanathan, Sammamish, WA (US); Phani Vaddadi, Issaquah, WA (US); Balbir Singh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 597 days.

(21) Appl. No.: 12/242,406

(22) Filed: Sep. 30, 2008

(65) Prior Publication Data

US 2010/0082440 A1    Apr. 1, 2010

(51) Int. Cl.
*G06Q 30/00* (2012.01)
*G06Q 30/02* (2012.01)

(52) U.S. Cl.
CPC ......... *G06Q 30/02* (2013.01); *G06Q 30/0271* (2013.01); *G06Q 30/0276* (2013.01)

(58) Field of Classification Search
CPC combination set(s) only.
See application file for complete search history.

(56) References Cited

U.S. PATENT DOCUMENTS

| 6,009,410 A * | 12/1999 | LeMole | G06Q 30/02 705/14.54 |
|---|---|---|---|
| 6,496,857 B1 | 12/2002 | Dustin | |
| 7,028,072 B1 | 4/2006 | Kliger | |
| 7,315,826 B1 | 1/2008 | Guheen et al. | |

(Continued)

FOREIGN PATENT DOCUMENTS

| CN | 1779672 A | 5/2006 |
|---|---|---|
| CN | 101379484 A | 3/2009 |

(Continued)

OTHER PUBLICATIONS

Histrova, Nataliya, and O'Hare, G.M.P., "Ad-Me: Wireless Advertising Adapted to the User Location, Device and Emotions," Proceedings of the 37th Hawaii International Conference on System Sciences, 2004, 10 pp., http://csdl2.computer.org/comp/proceedings/hicss/2004/2056/09/205690285c.pdf.

(Continued)

*Primary Examiner* — Matthew T Sittner
(74) *Attorney, Agent, or Firm* — Shook, Hardy & Bacon L.L.P (57) ABSTRACT

Systems, computer-implemented methods and computer-storage media are provided for presenting customizable advertisements to a user. Advertising is customized through the use of user-specific or user-relevant data. Items such as keywords, profile data, and application data are received and are then used to retrieve customizations. These customizations are stored by a server or group of servers that the vendor makes available to the advertising provider. Items that could further identify adaptations desirable for advertising, such as a user profile, may be sent to the vendor's server as well. The adaptations take forms that include pictures, text, graphics, links, audio, and video files. Systems that comprise an advertising server, a vendor server, and a client application used for completing the above method, as well as computer-readable media necessary at each device to accomplish the customizations, are also described.

20 Claims, 4 Drawing Sheets

(56) References Cited

U.S. PATENT DOCUMENTS

| | | | |
|---|---|---|---|
| 7,720,432 B1 | 5/2010 | Colby et al. | |
| 2002/0010626 A1* | 1/2002 | Agmoni | G06F 3/0481 705/14.58 |
| 2002/0046083 A1* | 4/2002 | Ondeck | G06Q 30/02 705/14.67 |
| 2002/0049637 A1* | 4/2002 | Harman | G06Q 30/02 705/26.1 |
| 2002/0073034 A1 | 6/2002 | Wagner et al. | |
| 2002/0082941 A1* | 6/2002 | Bird | G06Q 30/02 705/14.73 |
| 2002/0089530 A1* | 7/2002 | Markel | H04N 7/088 715/719 |
| 2002/0112033 A1* | 8/2002 | Doemling | G06F 17/2247 709/219 |
| 2002/0143853 A1* | 10/2002 | Isaac | G06F 17/3089 709/201 |
| 2002/0184118 A1* | 12/2002 | Gronemeyer | G06Q 30/06 705/28 |
| 2003/0106022 A1 | 6/2003 | Goodacre et al. | |
| 2003/0158938 A1* | 8/2003 | Adatrao | H04W 60/00 709/225 |
| 2003/0163372 A1 | 8/2003 | Kolsy | |
| 2004/0015998 A1* | 1/2004 | Bokor | H04N 7/17318 725/136 |
| 2004/0215559 A1* | 10/2004 | Rebenack | G06Q 20/102 705/40 |
| 2004/0225564 A1* | 11/2004 | Walsh | G06Q 30/02 705/14.61 |
| 2004/0267612 A1 | 12/2004 | Veach | |
| 2005/0060745 A1* | 3/2005 | Riedl | G06Q 30/02 725/42 |
| 2005/0080665 A1 | 4/2005 | Bowman-Amuah | |
| 2005/0086283 A1* | 4/2005 | Marshall | H04L 67/02 709/200 |
| 2005/0091111 A1* | 4/2005 | Green | G06Q 30/0262 705/14.59 |
| 2005/0096979 A1 | 5/2005 | Koningstein | |
| 2005/0102351 A1 | 5/2005 | Jiang et al. | |
| 2005/0102636 A1* | 5/2005 | McKeon | G06F 9/4443 715/854 |
| 2005/0114455 A1* | 5/2005 | Conroy | H04L 67/2819 709/206 |
| 2005/0144073 A1* | 6/2005 | Morrisroe | G06Q 30/02 705/14.5 |
| 2005/0144246 A1* | 6/2005 | Malik | G06Q 10/107 709/206 |
| 2005/0216572 A1* | 9/2005 | Tso | G06Q 30/0207 709/218 |
| 2005/0222903 A1* | 10/2005 | Buchheit | G06Q 10/107 705/14.54 |
| 2005/0235048 A1 | 10/2005 | Costa-Requena et al. | |
| 2006/0004630 A1* | 1/2006 | Criddle | G06Q 30/02 705/14.64 |
| 2006/0111971 A1 | 5/2006 | Salesin et al. | |
| 2006/0116924 A1* | 6/2006 | Angles | G06Q 30/02 705/14.56 |
| 2006/0149632 A1* | 7/2006 | Register | G06Q 30/02 705/14.27 |
| 2006/0212350 A1 | 9/2006 | Ellis | |
| 2006/0253453 A1* | 11/2006 | Chmaytelli | G06F 17/30867 |
| 2007/0022442 A1 | 1/2007 | Gil et al. | |
| 2007/0038765 A1 | 2/2007 | Dunn | |
| 2007/0038931 A1 | 2/2007 | Allaire et al. | |
| 2007/0043879 A1* | 2/2007 | Vidya Sagar | G06F 17/30887 709/246 |
| 2007/0050253 A1 | 3/2007 | Biggs | |
| 2007/0088851 A1* | 4/2007 | Levkovitz | G06Q 30/02 709/246 |
| 2007/0100960 A1* | 5/2007 | Eichstaedt | G06F 17/30902 709/217 |
| 2007/0150358 A1 | 6/2007 | Allen et al. | |
| 2007/0156524 A1 | 7/2007 | Grouf | |
| 2007/0157228 A1 | 7/2007 | Bayer et al. | |
| 2007/0174117 A1* | 7/2007 | Hendrickson | G06Q 30/02 705/14.4 |
| 2007/0174118 A1* | 7/2007 | Dekel | G06Q 30/02 705/14.54 |
| 2007/0192181 A1 | 8/2007 | Asdourian | |
| 2007/0233857 A1* | 10/2007 | Cheng | G06Q 30/02 709/224 |
| 2007/0276829 A1* | 11/2007 | Wang | G06F 17/30663 |
| 2007/0288309 A1* | 12/2007 | Haberman | G06F 17/30017 705/14.1 |
| 2007/0300152 A1 | 12/2007 | Baugher | |
| 2008/0004957 A1* | 1/2008 | Hildreth | G06Q 30/02 705/14.64 |
| 2008/0010117 A1 | 1/2008 | Oliveira et al. | |
| 2008/0040341 A1* | 2/2008 | York | G06Q 30/02 |
| 2008/0059312 A1* | 3/2008 | Gern | G06Q 30/02 705/14.72 |
| 2008/0086368 A1* | 4/2008 | Bauman | G06Q 30/02 705/7.34 |
| 2008/0097830 A1* | 4/2008 | Kim | G06Q 30/02 705/14.4 |
| 2008/0098420 A1 | 4/2008 | Khivesara et al. | |
| 2008/0133569 A1* | 6/2008 | Vu | G06Q 30/06 |
| 2008/0140445 A1 | 6/2008 | Wang | |
| 2008/0140524 A1* | 6/2008 | Anand | G06Q 30/02 705/14.66 |
| 2008/0201220 A1* | 8/2008 | Broder | G06Q 30/02 705/14.56 |
| 2008/0227436 A1* | 9/2008 | Gantman | G06Q 30/02 455/414.2 |
| 2008/0235042 A1* | 9/2008 | Boyd | G06Q 30/02 705/1.1 |
| 2008/0235351 A1 | 9/2008 | Banga et al. | |
| 2008/0244666 A1* | 10/2008 | Moon | H04N 7/17318 725/87 |
| 2008/0270238 A1 | 10/2008 | Zweben et al. | |
| 2008/0300983 A1* | 12/2008 | Chen | G06Q 20/102 705/14.46 |
| 2008/0310408 A1 | 12/2008 | Thompson et al. | |
| 2008/0319839 A1* | 12/2008 | Olliphant | G06Q 30/02 705/14.54 |
| 2008/0319845 A1* | 12/2008 | Adkins | G06Q 30/02 705/14.27 |
| 2009/0007171 A1* | 1/2009 | Casey | G06Q 30/02 725/34 |
| 2009/0037822 A1* | 2/2009 | Kandekar | G06Q 10/00 715/733 |
| 2009/0055132 A1* | 2/2009 | Cheng | H04L 12/24 702/187 |
| 2009/0055249 A1 | 2/2009 | Lieberman | |
| 2009/0055334 A1* | 2/2009 | Song | H04L 67/306 706/17 |
| 2009/0055523 A1* | 2/2009 | Song | H04L 67/306 709/224 |
| 2009/0063280 A1 | 3/2009 | Wurster et al. | |
| 2009/0106663 A1* | 4/2009 | Pirie | G06Q 30/02 715/744 |
| 2009/0119179 A1 | 5/2009 | Kolve et al. | |
| 2009/0133059 A1* | 5/2009 | Gibbs | G06F 17/30038 725/34 |
| 2009/0171939 A1* | 7/2009 | Athsani | G06F 17/30241 |
| 2009/0198580 A1* | 8/2009 | Broberg | G06Q 30/02 705/14.1 |
| 2009/0216606 A1* | 8/2009 | Coffman | G06Q 30/02 705/14.1 |
| 2009/0248505 A1* | 10/2009 | Finkelstein | G06Q 30/02 705/14.16 |
| 2009/0254824 A1* | 10/2009 | Singh | G01C 21/3679 715/716 |
| 2009/0299817 A1* | 12/2009 | Fok | G06F 17/30867 705/14.64 |
| 2009/0313127 A1* | 12/2009 | Chaiken | G06Q 30/02 705/14.72 |
| 2010/0036733 A1* | 2/2010 | Chan | G06Q 30/0256 705/14.54 |

(56) References Cited

U.S. PATENT DOCUMENTS

| | | | |
|---|---|---|---|
| 2010/0036737 A1* | 2/2010 | Shenfield | G06Q 30/0262 705/14.59 |
| 2010/0037204 A1* | 2/2010 | Lin | G06Q 30/0267 717/106 |
| 2010/0043046 A1* | 2/2010 | Sen | H04N 7/17318 725/133 |
| 2010/0082440 A1* | 4/2010 | Vaidyanathan | G06Q 30/02 705/14.72 |
| 2010/0106703 A1* | 4/2010 | Cramer | G06F 17/30867 707/706 |
| 2010/0146079 A1* | 6/2010 | Bramley | G06Q 30/02 709/219 |
| 2010/0161425 A1* | 6/2010 | Sideman | G06Q 30/0269 705/14.66 |
| 2010/0235244 A1* | 9/2010 | Clausen | G06Q 30/02 705/14.73 |
| 2010/0293474 A1* | 11/2010 | York | G06Q 30/02 715/751 |

FOREIGN PATENT DOCUMENTS

| | | | |
|---|---|---|---|
| JP | 2006505077 A | 2/2006 | |
| JP | 2006146939 A | 6/2006 | |
| JP | 2007028228 A | 2/2007 | |
| JP | 2008152431 A | 7/2008 | |
| KR | 1020050048224 A | 5/2005 | |
| KR | 1020070072673 A | 7/2007 | |
| KR | 1020080017815 A | 2/2008 | |
| WO | 0137189 A2 | 5/2001 | |
| WO | 2008024690 A2 | 2/2008 | |

OTHER PUBLICATIONS

Mills, Elinor, "Yahoo Launches Customizable Ad Tool," CNETNews.com, Jul. 1, 2007, 3 pp., http://news.cnet.com/Yahoo-launches-customizable-ad-tool/2100-1024_3-6194462.html.

Simpson, George H., "Real Time Matrix Introduces Customizable Advertising Platform that Integrates Brands With Real-Time Multimedia News and Information," BNET.com, Dec. 2007, 2 pp., http://findarticles.com/p/articles/mi_pwwi/is_200712/ai_n21135550/print?tag=artBody.

International Search Report with Written Opinion dated Feb. 9, 2011 in Application No. PCT/US2010/042564, 9 pages.

European Search Report dated Jan. 2, 2013 in European Application No. 10802761.6, 9 pages.

Australian Office Action dated Apr. 4, 2014 in Australian Application No. 2010276348, 4 pages.

Japanese Notice of Rejection dated Feb. 5, 2014 in Japanese Application No. 2012-521725, 4 pages.

Chinese Office Action dated Mar. 5, 2014 in Chinese Application No. 201080033010.5, 13 pages.

Australian Office Action dated Jun. 11, 2014 in Australian Application No. 2010276348, 3 pages.

Chinese Office Action dated Oct. 30, 2014 in Chinese Application No. 201080033010.5, 7 pages.

Non-Final Office Action dated May 8, 2012 in U.S. Appl. No. 12/506,762, 20 pages.

Final Office Action dated Oct. 23, 2012 in U.S. Appl. No. 12/506,762, 23 pages.

Non-Final Office Action dated Nov. 5, 2014 in U.S. Appl. No. 12/506,762, 25 pages.

NPL: WhirlWind Creative, "Advertising Services" downloaded from the Internet May 20, 2009, http://www.whirlwind-designs.com/ advertising_services.html, 2 pages.

NPL: Casati et al, "Adaptive and Dynamic Service Composition in eFlow" Hewlett Packard, Mar. 2000, http://www.hpl.hp.com/techreports/2000/HPL-2000-39.pdf, 19 pages.

NPL: Live Technology, "LiveAdMaker" downloaded from the Internet Jul. 21, 2009, http://www.liveadmaker.com/?section+mediachannels, 2 pages.

NPL: LiveAdMaker, http://www.liveadmaker.com, 1 page.

NPL: Rakesh Mohan et al, "Adapting Multimedia Internet Content for Universal Access," IEEE Transactions on Multimedia, IEEE Service Center, Piscataway, NJ, US, vol. 1, No. 1, Mar. 1, 1999 (Mar. 1, 1999).

"Office Action Issued in European Patent Application No. 10802761.6", Mailed Date: Jan. 28, 2015, 4 Pages.

"Office Action and Search Report Issued in Chinese Patent Application No. 201080033010.5", Mailed Date: May 7, 2015, 14 Pages.

Final Office Action dated May 29, 2015 in U.S. Appl. No. 12/506,762. 28 pages.

\* cited by examiner

ADAPTIVE RUN-TIME ADVERTISEMENTS

BACKGROUND

As media becomes more user-specific in nature, the granularity with which advertising is supplied must keep pace. Some activities, like browsing the internet and playing video games, can be highly individualistic. Therefore, vendors would like to target their advertising to those users that create the best return on that advertising. This can be seen most when vendors pay for advertisements on a per-placement or a per-view basis. However, the information that is available to both the advertising provider and the vendor could further refine this narrowing of audience. On the other hand, the production of every possible advertisement the vendor could produce becomes unwieldy when there are large number of potential ads. Instead, if ads could be customized at run-time using this information, then more specific ads could be placed without the need for countless variations on the base advertisement. If customization of this nature could originate from the vendor rather than the intermediary advertising provider, another level of flexibility also could be achieved.

SUMMARY

Embodiments of the present invention relate to methods, systems, and computer-storage media for presenting advertising to a user that can be customized, adapted, or enhanced at run-time for a specific user. The embodiments allow flexibility so that the advertising provider or the vendor that is placing the advertisement are not unduly burdened with producing large numbers of advertising creatives. Instead, advertisements are placed as usual, but are created with the ability to customize the ads based on information specific to the user. The information, which can be generated based on the use of the application itself or in conjunction with other data already stored for the user, then leads to updates in the base advertisement. Thus, an entirely new advertisement need not be created.

Particularly, a system for presenting to a user customizable computer-generated advertisements is provided. An application on a client device is configured to request advertisements and provide user-specific context items. A first set of servers is configured to provide advertisements, wherein at least a portion of the advertisements is configured to receive enhancements during run-time execution. A second set of servers is configured to provide vendor information, wherein the vendor information can be communicated to the application to enhance advertisements according to user-specific context items. Data stores contain advertising content for vendors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The embodiments of the invention include methods of customizing advertising through the use of user-specific or user-relevant data. Items such as keywords, profile data, and application data are received by a server or group of servers that deliver advertising. The items are then used to retrieve customizations from a server or group of servers that the vendor makes available to the advertising server. Items that could further identify adaptations desirable for advertising may be sent to the vendor server, e.g., a user-profile identifier. Examples of adaptations or enhancements include pictures, text, graphics, links, audio, and video files that are highly specific to the user. Other embodiments include a system that comprises an advertising server, a vendor server, and a client application used for completing the above method. Embodiments also include computer-readable media necessary at each device to accomplish the customization.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer storage media having computer-executable instructions embodied thereon that, when executed, present an advertisement to a user. These embodiments can be used in a variety of client applications, with web browsers, online video game environments, and served productivity applications representing an illustrative but non-exhaustive list of potential placements. The advertisement is coded such that it can be enhanced or customized specific to the user through the use of user-specific context items. These items can include keywords, web addresses, user locations, search terms, information from a user profile, information from application cookies, and the like.

There are multiple coding formats that can be utilized. The enhancements can give more specific products and services offered by the advertiser, be related to the user's current application usage, follow established user patterns, or may replace the advertisement altogether with a new ad. All of these updated elements are stored by the vendor rather than the ad serving entity. This allows flexibility in advertisement without burdening the vendor or ad server with hundreds or thousands of permutations of substantially similar ads. This can also allow the vendor to keep up-to-date information for instances of time-sensitive advertising. Examples of this advantage can be seen with limited-time advertising windows, such as discount sales, concerts, movie openings, and so forth.

Having briefly described an overview of embodiments of the present invention, an exemplary operating environment suitable for implementing embodiments hereof is described below. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

Figure 1:
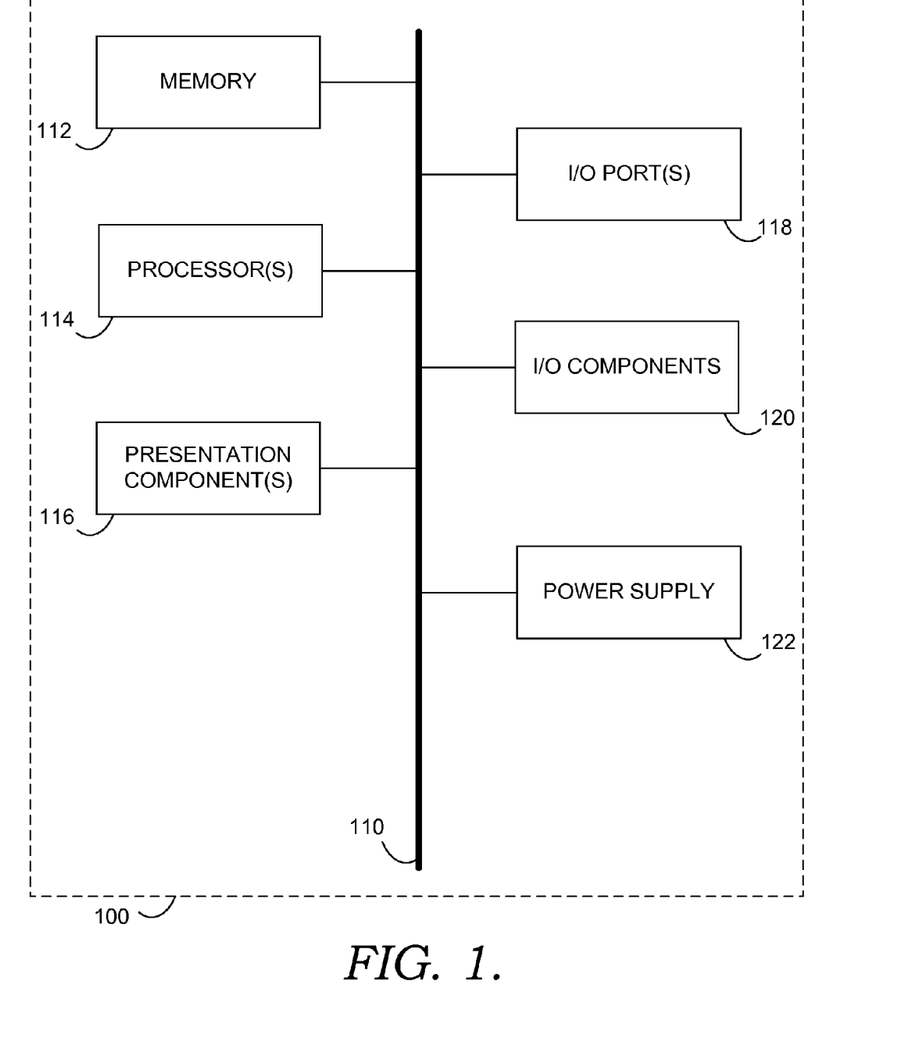
FIG. 1 is a block diagram of an exemplary computing system suitable for use with claimed embodiments of the present invention.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

As described above, the claimed embodiments of the present invention can be used in a number of application programs in the exemplary computing environment. For example, one of ordinary skill in the art will readily recognize the usefulness when placing advertisements for web sites. Thus, any web provider offering advertising space on its web site can implement and benefit from the claimed embodiments. Likewise, more specialized applications, such as video games, can also utilize the advertisements in the following descriptions. This could apply to advertisements presented during periods when a game is not actually being executed, as well as the advertisements placed within the game's environment. Productivity software pushed to a user, such as served word-processing, database, and spreadsheet applications could also use these advertising methods, systems and media. There are other applications, not included on the above list, that are contemplated within the scope of the claimed embodiments of the present invention, but are too numerous to exhaustively list.

The advertising described takes a number of forms within the applications as described herein. In one embodiment, the advertisement is a banner ad, or a portion of screen presentation such as a browsed web page, video-game screen, or application user interface. In another embodiment, the advertisement is a pop-up ad as shown on a similar application. In another embodiment, the ad is a "fly-over" advertisement that employs an on-screen animation technique. Yet another embodiment uses an expanding banner presence on the screen. The advertisement is enlarged when a movement over the ad takes place, such as a mouse or cursor movement within the boundaries of the advertisement. The advertisements can be coded as objects in various programming languages. For example, extensible markup language (XML) is used in certain embodiments, while Javascript Object Notation (JSON) is utilized in others.

The following descriptions outline various bits of data and information that can be used in order to enhance, adapt, or customize an advertisement. Enhanced ads, adapted ads, or customized ads should be understood to describe the same processes. There are a number of naming conventions that are used to describe information needed to enhance ads, such as context items, user-specific context items, and user-relevant factors. Context items can take numerous forms. For example, keywords entered by a user at a web site form one or more context items. Likewise, descriptors of the web site itself provide context for the claimed embodiments. The determination of the user's location also is a context item.

When the web site has a user profile with stored data, such data also is a user-relevant factor. Portions of this information may be stored locally, such as through an application "cookie" file. A cookie file includes browsing history, preferences, form data, and so forth. The user profile information may also be stored on a server and accessed by passing an identifier from the user's application to the server. This system for storing profile information also can be used for form data. However, server-stored user profiles are capable of including much more information. Examples include purchasing histories, such as those tracked by a grocery store discount card, user areas of interest, and requested alerts, among others.

Figure 2:
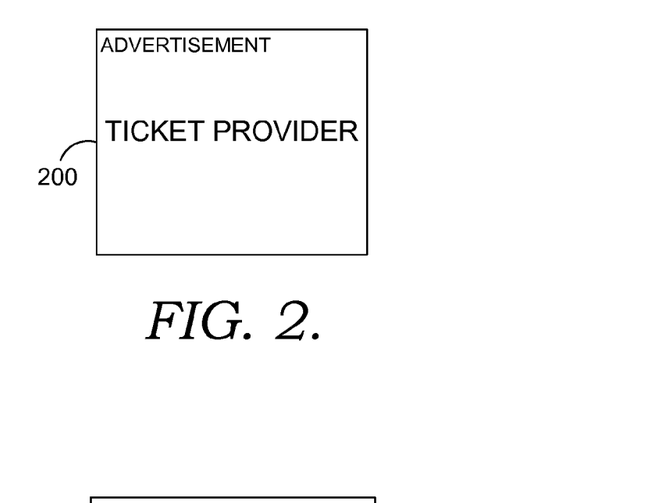
FIG. 2 is an exemplary advertisement prior to enhancement in accordance with claimed embodiments of the present invention.
Figure 3:
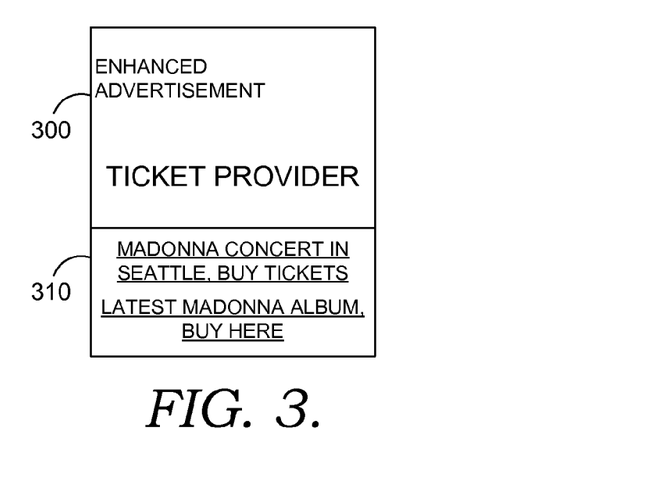
FIGS. 3 and 4 are exemplary advertisements after enhancement according to claimed embodiments of the present invention.
Figure 4:
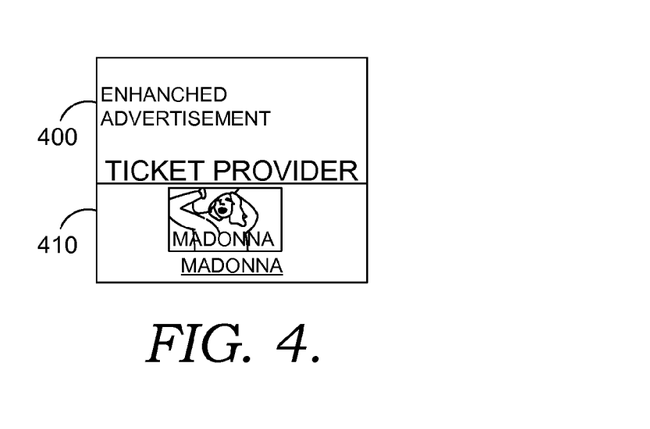

Turning now to FIGS. 2-4, exemplary advertisements are shown that are in accordance with claimed embodiments of the present invention. As seen in FIG. 2, an advertisement 200 is shown that has not been enhanced, but has the ability to be adapted or customized at run-time. The exemplary ad is for a ticket service, but this is not a limitation of the present invention. Advertisement 200 is any one of the types of ads described above, coded in exemplary programming languages, or is an ad that is substantially similar to those described. Ad 200 is a typical banner ad as may be seen in a host of applications described above. The lack of a photo, graphic, or video on advertisement 200 prior to customization is not intended to convey it cannot incorporate those formats of files. To the contrary, any typical advertising method can be used in the advertisement prior to enhancement.

Although not apparent from the illustration, ad 200 is a customizable ad, as will be described in further detail below. There is an open space intended to show an area that may be used at run-time for the described customizations. The reservation of space allows one of the above enhancements to take place, so that more targeted information specific to the user can be presented. While the reservation of space on an advertisement is used for illustrative purposes in this disclosure, it is not necessary. Advertisements that are "generic" to a great number of users could be replaced altogether when context items indicate a desire to show other specific advertising. It is possible to program replacement of the entire advertisement and remain within the scope of the present invention. Likewise, a portion of an ad can be replaced. For instance, replacing one graphic with a different graphic when a condition exists is one potential customization. Showing different text is another example.

The instances of customization above are implemented within the coding of the advertisement. Utilizing an exemplary programming language that is flexible in nature, XML or JSON for example, allows the advertising provider to define properties of the ad. The vendor, on the other hand, can create enhancements that are retrieved when those properties are present. In the illustrated example, advertisement 200 could be placed on a search engine web page when a user searches for a musical artist. This is based on the universal resource locator (URL) of the search engine and some of the keywords associated with the search. Because ad 200 is not enhanced, it can be used for any musical search. However, the coding of the customization aspect allows ad 200 to further determine context items. Additional keywords, profile settings, or other indicia are matched up with existing enhancements, which are stored separately.

Looking at FIG. 3, a first enhanced advertisement 300 is depicted with a larger ad size. Advertisement 300 includes additional textual information along the bottom portion of the advertisement, which also includes a hyperlink for the user. This additional text is shown in a customized area 310. Enhanced ad 300 also supplies the user a link to a different site altogether to purchase a related item in customized area 310. In both instances, the additional information and links illustrated are a particular musical act that may be determined from context items of the user. Thus, matching the received context items with user profile information or previous purchases can allow the vendor to determine and provide customization options.

TABLE 1

```
<?xml version="1.0" encoding="utf-8"?>
<Ad Id="BSS003" Version="1.0" xmlns="urn:schemas-microsoft-com:
advertisement:enhancement">
  <Author>Ticketservice</Author>
  <Company>Ticketservice, Inc.</Company>
  <Publisher>Microsoft</Publisher>
  <Enhancement>
    <AdContext>
      <Keywords>Music; Rock;</Keywords>
      <Server urlFormat="http://msn.com/search?AdID=##1##">
        <Parameter name="adid" number="1" />
      </Server>
    </AdContext>
    <Server
urlFormat="http://www.ticketservice/search?tm_link=
tm_header_search&keyword=##1##&AdID=##2##">
      <Parameter name="keyword" number="1" />
      <Parameter name="adid" number="2" />
    </Server>
  </Enhancement>
</Ad>
```

Once again, the matching process can be more flexible than simply creating ad after ad with all permutations and combinations possible. As seen in FIG. 3, the text and links may be part of a separate file, given a separate identifier, and recalled when particular searches are performed. The original advertisement is programmed with code that retrieves the enhancement associated with the identifier. Thus, it could be as specific as the search for the particular artist the enhancement concerns, or could be returned when the artist's genre is searched. This prevents the advertising provider from having to store to a server hundreds or thousands of different images, media items, and assorted files for advertisements for a publisher, like a search engine web site. Additionally, items like the upcoming concert information that change on a relatively rapid basis could be updated by the vendor, rather than the advertising provider, through replacement of just a portion of the ad. This also mitigates the need for the vendor to frequently provide updated information to the advertising provider, given that the entire advertisement does not need to change. An exemplary code segment can describe these properties as seen above in Table 1. The same example can also be seen with a JSON code segment shown below in Table 2.

TABLE 2

JSON

```
{Ad:
  Id:'BSS003',
  Version:'1.0',
  Author:'Ticketservice',
  Company:'Ticketservice Inc',
  Publisher:'Microsoft',
  Enhancement:{
    AdContext:{
      Keywords:'Music; Rock;',
      Server:{ urlFormat:'http://msn.com/search?AdID=##1##'
        Parameters:[ {name:'adid', number:'1'}]
      }
    }
    Server: {
    urlFormat:'http://www.ticketservice/search?tm_link=
tm_header_search&keyword=##1##&AdID=##2##',
      Parameters:[
        {name:'keyword', number:'1'},
```

TABLE 2-continued

JSON

```
        {name:'adid', number:'2'},
      ]
    }
  }
}
```

FIG. 4 depicts a second enhanced advertisement 400. Advertisement 400 is shown as the same size as advertisement 200 to show that the size of the advertisement need not change when adding a customization. However, there is now a picture of an artist shown in a customized area 410. In the example of a ticket-selling service, this could be a picture that is linked to a specific URL selling tickets for the artist's concert. The image could simply have text stating the date of a concert featuring the artist and need not be linked. Neither form is a limitation to the scope of the claimed embodiments of the present invention. Instead, these illustrations convey that files of the same format need not be used, i.e., text for text or image for image. Rather, any customization may be possible as long as it is referred to by the ad enhancement stored by the vendor. The customization can replace an ad with a similar ad in a different animation format. Thus, a pop-up ad could be customized to be a fly-over ad based on the context information.

There are still other means of customizing the advertisement with various contexts. The picture could be linked to call the ticket-selling service in the case of a cellular telephone advertisement. The protocol through which the context items are sent helps direct the actions of the vendor server. A keyword and a protocol could form one request for enhancement, while the same keyword and a different protocol could form another. Thus, context items first sent in a protocol indicative of a cellular telephone, such as wireless access protocol (WAP), could be returned with a click-to-dial link that puts the user in contact with the ticket service's toll-free contact center. Context items sent with an internet protocol (IP) format could return a link to order tickets online. Undetermined protocols could result in a simple image, or simpler yet, text.

While ad 300 and ad 400 are used to illustrate exemplary customizations that are possible, the combination can depict the flexibility available to vendors with the claimed embodiments of the present invention. For instance, the enhancement placed in area 310 of ad 300 could be available for a proscribed period of time leading up to a concert in the user's area. However, once the concert has taken place, the enhancement in ad 300 is replaced with the enhancement seen in ad 400. The vendor can simply change the enhancement associated with the identifier used to call the adaptation. Thus, the vendor enjoys flexibility in the placement without bombarding the advertising provider with constant updates to ad creatives. The differences in ads 300 and 400 also show the vast numbers of context items possible, all of which can be used in combination. Date, time of day, profile data, protocol, keywords, and search terms offer hundred of potential combinations.

One reason for the use of more information is the separation of vendor and advertising serving functions. The vendor is more attuned to specifics in the vendor's commercial space. The advertising server, on the other hand, is merely a conduit for that vendor. Therefore, the vendor is a better place to understand what enhancements should take place based on current conditions in that commercial space. Advertising servers, on the other hand, are going to have limited knowledge about any one area of commercial activity. Particularly for wide-serving advertising providers, for publishers like search engine web sites, the ability to track every trend in different industries is nearly impossible. Therefore, the changing needs of the vendor are better served by giving those businesses more control over their advertising placement.

Figure 5:
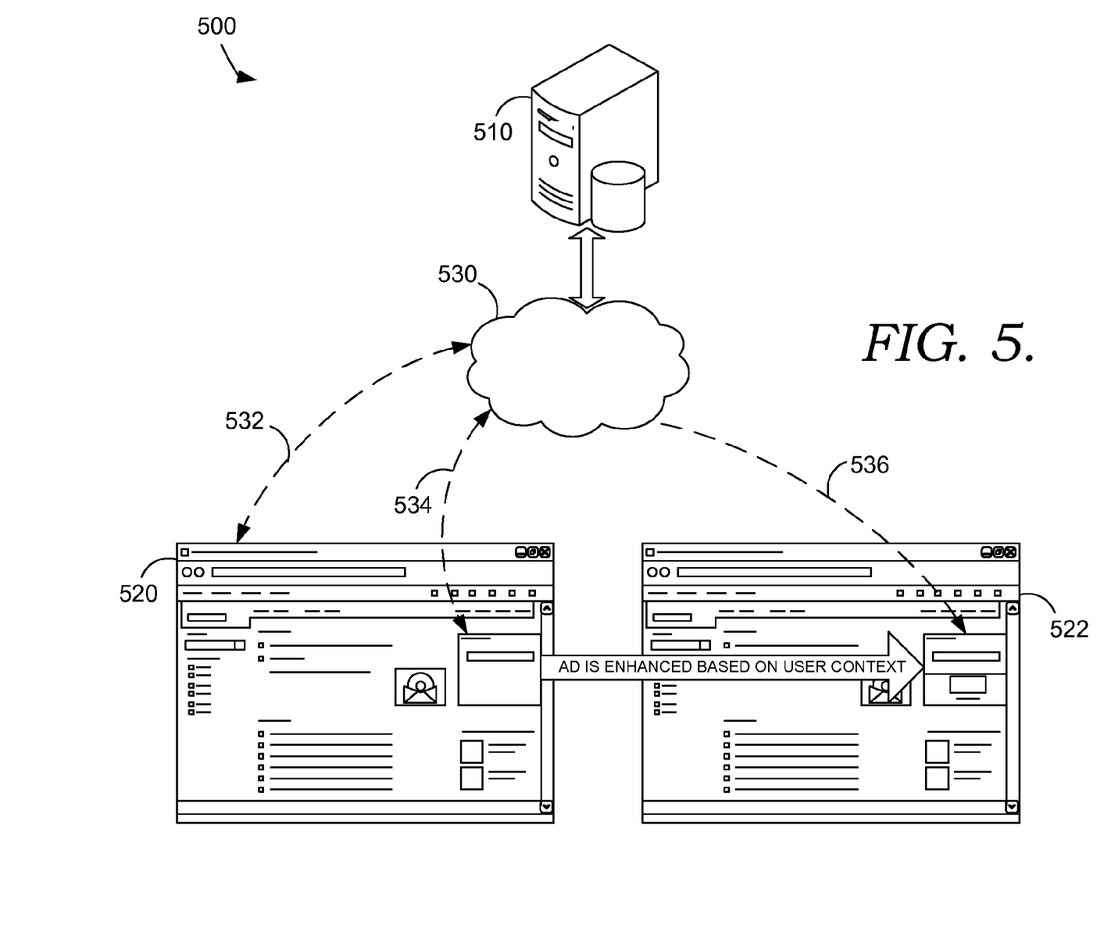
FIG. 5 is a suitable network environment in which claimed embodiments of the present invention may be practiced.

Turning now to FIG. 5, an exemplary system 500 with which claimed embodiments of the present invention may be practiced is shown. A server 510 configured to provide vendor information is depicted at the top of the figure. Server 510 contains graphics, images, videos, and other assorted files used for customizing the advertisements described above. In addition, server 510 includes files that describe the customizations and refer to the various files needed to complete the process, similar to those seen in Tables 1 and 2. These files describe the properties and components of the enhancement through tags in the coding, such as through the XML or JSON descriptions shown above. A two-way arrow, not numbered, couples server 510 with a network 530. This bi-directional coupling allows information to travel from server 510 to network 530 and vice versa. In this way, context information can be sent to server 510 and ad enhancements can be sent to network 530. This is not intended to limit the means with which server 510 and network 530 may communicate, only that there is a means of communication.

Continuing with FIG. 5, a web page 520 with an initial advertisement is shown. Web page 520 and the corresponding ad on that page are presented to the user through communication by way of network 530. Network 530 is depicted as a cloud, because the delivery method can be variable in nature. Although this figure illustrates a web page, a different client application is contemplated within the scope of the present invention. Thus, web page 520 could just as easily be a served application, a video-game screen, or other computer-generated interface that lends itself to advertising. For the sake of this example, a second web page 522 with an enhanced advertisement is shown. Network 530 could include an internet connection. Additional components that reside on network 530 that are not necessary for understanding the invention are not shown so as not to obscure the scope of the present invention.

The page is rendered through communication 532, depicted as a dashed line representing the information sent by way of network 530 to web page 520. With the exception of the customizable advertisement requested, this is a typical data flow between a requesting device and a server, and is also noted with arrows on each end to show that it is bi-directional. After web page 520 itself has been rendered, communication 534 takes place. Information to render the initial ad is communicated by way of network 530 to web page 520 to answer a request by the client application (i.e., web browser). This customizable ad is returned by an advertising server in network 530 to a publisher. Because additional context items are returned from web page 520 to network 530, the bi-directional flow of communication 534 is taken a step further when embodiments of the present invention are utilized. The nature of the ad on webpage 520 results in at least portions of this ad containing a reference to an ad customization on the vendor's server.

The information that flows in communication 534 results in a final exchange of data, seen in FIG. 5 as a communication 536. The information needed for the enhanced ad, thus allowing the client application to render the enhanced advertisement, is included in communication 536. The result of this one-way transmission of information from network 530 to the client application produces web page 522, which contains the enhanced advertisement. This customization is based on the content item and the stored enhancement.

The advertisements and systems shown more generally fall under the use of computer-implemented methods of delivering adapted advertisements. As one of ordinary skill in the art appreciates, typically ads are complete as served by the advertising provider. Thus, an advertisement server stores and serves the ad as the vendor wishes to have it presented. There is little to no communication between the advertising provider and the vendor seeking advertising once the "final" ad is approved and placed, and it is usually of a financial nature (e.g., confirming placement and views, billing, etc.). However, the disclosed methods allow for flexibility in the placement of ads, as the vendor can update what is placed in customized ads. Changes by the vendor to the enhancement, or to the contexts with which the enhancement is used, can take effect in a nearly real-time manner.

Also inherent with this increase in the contextual basis for advertisements is the ability to manipulate data to provide customer-serving purposes. For example, one purpose of discount cards at grocery stores are to track customer habits and to stock items appropriately. Items most frequently purchased are discounted on a more regular basis, while these foods and goods also are kept in larger supply. However, the customer profiles are stored and updated by the grocer when a user purchases items. The ability to access this data during the execution of online advertising could better target the customer and increase the effectiveness of the ad. If a user accesses a grocer's web site to order food and goods for delivery, the ability to advertise or to present coupons for items that the user frequently purchases becomes useful to all involved in the transaction.

Similarly, customer data can be used in conjunction with other context items, such as the pages of a user's current web browsing session. For the user that views recipes online and has shopped for groceries via the internet, the combination can lead to directed advertising. Viewing a recipe on a web site results in several context items. The ingredients of the recipe are all relevant. The particular grocer the user frequents, or with which the user has a customer profile, also is relevant. Using embodiments of the present invention, the ingredients, store, and customer profile information can all be transmitted to the advertising server. The store and profile information can then result in consultation with the grocery store's server. The necessary ingredients for the recipe can be checked against the store's current discount items, as well as brands that the user typically purchases. Therefore, when serving the ad to the user, it can be customized to not only advertise the particular grocer, but can include a coupon for a specific brand that the user normally buys and that is currently on sale. The relevance of the ad with relation to the customer is increased, potentially on several levels.

Figure 6:
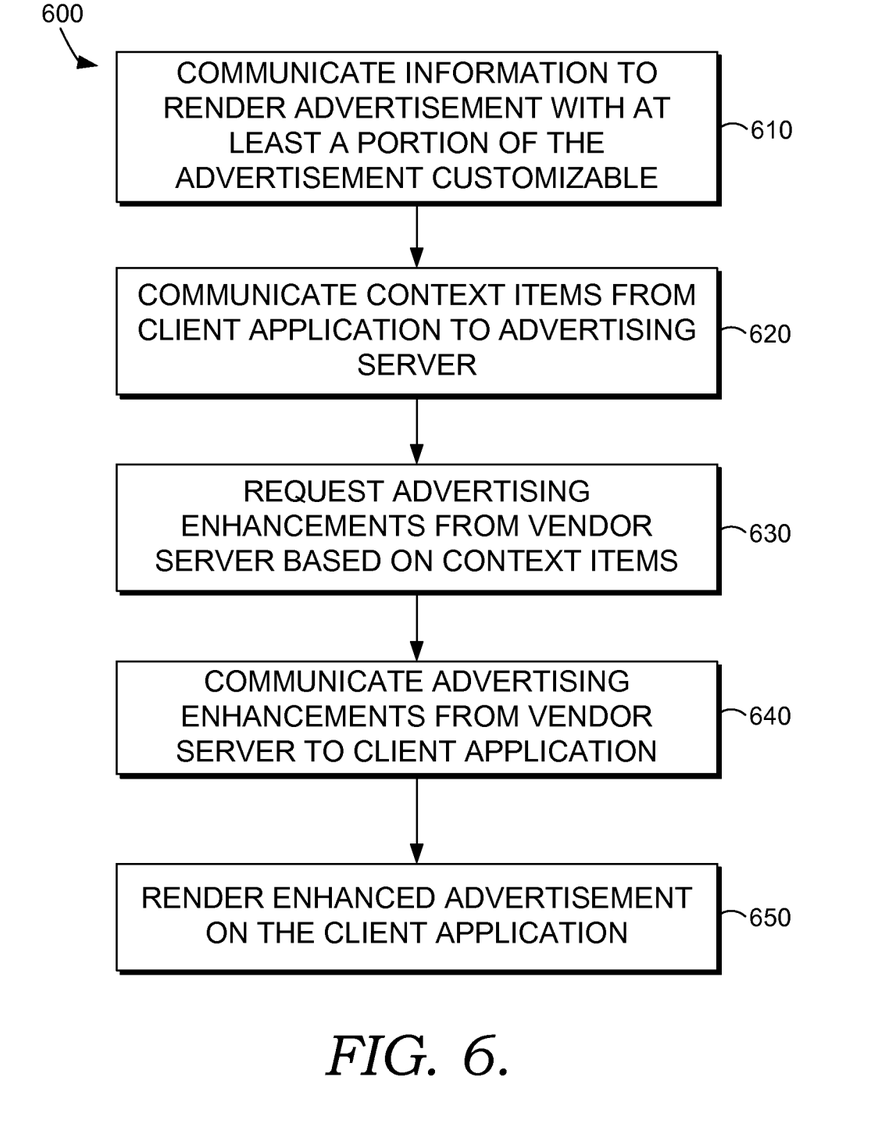
FIG. 6 is a flowchart of a method for adapting advertisements in accordance with claimed embodiments of the present invention.

A flowchart representing a computer-implemented method of customizing ads is shown in FIG. 6. At a step 610, information is communicated to render advertisement so that at least a portion of the ad is customizable. The customizable advertisement is coded in a language such as XML or JSON, so that additional items such as images, graphics, audio, video, text, and the like may be presented. The information is any of the previously mentioned forms, including keywords, URLs, customer information, application cookie data, and so forth.

At a step 620, context items are communicated from the client application to advertising server. Again, these can be any one of a number of items inherent to the site, application, protocol, activity, or user. At a step 630, ad enhancements are requested from a vendor's server based on context items. The vendor's server has enhancements stored and referenced according to the above described files. The enhancements used can be quickly and flexibly modified so that only the enhancement is changed based on the given context items, not the entire ad. Thus, changing from a first sale item to a second sale item leads to advertising the second item in place of the first when appropriate, even though the context items may be the same. Only the reference has changed. The user searching for music of a certain genre may receive an ad for the concert of one artist while browsing at a first time. A second search very close in time may receive an ad for another artist's show, based on the first concert selling all of its tickets. These enhancements are requested based on the communication of the advertising server.

At a step 640, ad enhancements are communicated from the vendor's server to the client application. While this communication may take place between the vendor server and the advertising server, before being forwarded to the client application, it need not be. A request for ad enhancements can include the address of the client application receiving the customizable ad. Therefore, either directly, or by way of the advertising server, the enhancement is transmitted from the vendor to the client application. This leads to a step 650, when the enhanced ad is rendered.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer-implemented method for presenting advertisements to a user through a client application, the method comprising:

communicating a request for an advertisement, the request being from the client application at a client device to a first server that is configured to provide advertisements, and the first server being an advertising server that serves advertisements;

receiving at the client application a first advertisement that has not changed or has not been enhanced;

extracting one or more context items from the client device, the one or more context items indicating interactions of the user on the client device;

communicating the one or more context items to the first server;

receiving at the client application one or more ad enhancements from a second server that is configured to provide vendor information, the one or more ad enhancements being based on the one or more context items indicating the interactions of the user on the client device;

customizing a portion of the first advertisement sent from the first server with the one or more ad enhancements sent via the second server; and rendering the first advertisement sent from the first server and the one or more ad enhancements sent via the second server at the client application.

2. The computer-implemented method of claim 1, wherein the extracting one or more context items further comprises extracting keywords associated with a browsed web page.

3. The computer-implemented method of claim 1, wherein the extracting one or more context items further comprises extracting at least a portion of a user profile stored in an application cookie.

4. The computer-implemented method of claim 1, wherein the extracting one or more context items further comprises extracting an identifier associated with the user, wherein the identifier is used to access a customer profile at the second server configured to provide vendor information.

5. The computer-implemented method of claim 1, wherein the extracting one or more context items further comprises extracting user location information.

6. The computer-implemented method of claim 1, wherein receiving the one or more ad enhancements comprises receiving one or more of a graphic, an image, an audio file, a video file, a scripting code, a link, a coupon, and a portion of code rendering additional text.

7. The computer-implemented method of claim 1, wherein receiving the one or more ad enhancements comprises time-sensitive information.

8. The computer-implemented method of claim 1, wherein the one or more context items indicating interactions of the user on the client device comprises content of a page of the user's current web browsing session.

9. The computer-implemented method of claim 1, wherein the one or more context items indicating interactions of the user on the client device comprises a first search query and a second search query close in time to the first search query.

10. One or more computer-storage hardware devices having computer-executable instructions embodied thereon for customizing advertising content at a first server configured to provide advertisements, the instructions configured to:
  receive at the first server a request for an advertisement, the request being received from a requesting application at a client device, and the first server being an advertising server that serves advertisements;
  communicate an advertisement that has not yet been adapted;
  receive one or more user-relevant factors from the requesting application at the client device, the one or more user-relevant factors indicating interactions of the user on the client device;
  communicate the one or more user-relevant factors to a second server configured to provide vendor information;
  receive one or more adaptation elements from the second server, the one or more adaptation elements being based the one or more user-relevant factors; and
  communicate the one or more adaptation elements to the requesting application at the client device,
  the one or more adaptation elements relating to a portion of information in the advertisement, the one or more adaptation elements being used to adapt the advertisement that has not yet been adapted.

11. The device of claim 10, wherein the user-relevant factors further include at least one of a keyword, application metadata, information contained in an application cookie, user profile information, and a user location.

12. The device of claim 11, wherein the user-relevant factors received from the client application correspond directly to the one or more adaptation elements.

13. The device of claim 11, wherein the user-relevant factors are further manipulated to determine the one or more adaptation elements.

14. The device of claim 13, wherein the first server derives the one or more adaptation elements through direct manipulation of the one or more user-relevant factors.

15. The device of claim 14, wherein the direct manipulation is a determination of user location based on a received internet protocol (IP) address.

16. The device of claim 13, wherein the second server derives the one or more adaptation elements through manipulation of the one or more user-relevant factors.

17. The device of claim 16, wherein the manipulation by the second server includes determining a scheduled event associated with interests of the user.

18. The device of claim 16, wherein the manipulation by the second server includes determining a discounted item associated with user purchasing habits.

19. The device of claim 16, wherein the manipulation by the second server includes determining an additional vendor offering products associated with the product included in the advertisement.

20. A system for presenting to a user customizable computer-generated advertisements, the system comprising:
  an application on a client device configured to request advertisements and provide user-specific context items, the user-specific context items comprising pages of the user's current web browsing session;
  a first set of one or more servers configured to provide advertisements that are un-customized, at least a portion of the advertisements being configured to receive ad enhancements during run-time execution, the advertisements not being based on the user-specific context items;
  a second set of one or more servers configured to provide vendor information, the vendor information being communicated to the application to enhance advertisements according to user-specific context items, the vendor information being based on the user-specific context items, the vendor information not being received by the first set of one or more servers; and
  one or more data stores containing advertising content for one or more vendors.

* * * * *